United States Patent [19]
Jamison

[11] 3,812,615
[45] May 28, 1974

[54] METHOD OF COATING SOIL WITH AN AGRICULTURAL MULCH

[75] Inventor: Saunders Eliot Jamison, Summit, N.J.

[73] Assignee: Celanese Corporation, New York, N.Y.

[22] Filed: June 1, 1972

[21] Appl. No.: 258,561

[52] U.S. Cl. ............. 47/9, 260/2.5 R, 260/2.5 EP, 260/17 R, 260/17.4 CL, 260/29.6 NR
[51] Int. Cl. .......................... C08f 45/24, A01g 7/00
[58] Field of Search..... 260/17.4 CL, 2.5 EP, 2.5 R; 47/9

[56] References Cited
UNITED STATES PATENTS
3,305,498   2/1967   Herman et al............... 260/17.4 CL
3,578,548   5/1971   Wesp ........................... 250/2.5 EP

*Primary Examiner*—Murray Tillman
*Assistant Examiner*—Morton Foelak

[57] ABSTRACT

Foamed material suitable for use in connection with agricultural endeavors which is produced by agitating a mixture comprising: (1) a fibrous material, (2) water, (3) a wetting agent, (4) a thickening material, (5) an acrylic polymer emulsion, and (6) a polyepoxide. The foam is then applied onto the surface of the soil where it dries and cures to form an air and water permeable protective coating which retains its structural integrity throughout the growing season and may be broken up and turned into the soil at the beginning of the next season.

10 Claims, No Drawings

METHOD OF COATING SOIL WITH AN AGRICULTURAL MULCH

BACKGROUND OF THE INVENTION

1. Field of the Invention

The present invention relates to foamed material suitable for use in connection with agricultural endeavors. More specifically, the invention concerns novel cellulose foam cured in situ at ambient temperatures for agricultural applications.

2. Description of the Prior Art

Agricultural mulches are, in general, well known. These materials are used to cover the soil about crops or other plantings in order to prevent soil erosion, to prevent or retard weed growth, to increase soil water retention and to moderate soil temperature.

Various naturally occurring materials have been used for this purpose for many years such as peat, peat moss, wood chips, chopped bark, saw dust, straw, ground corn, barley hulls, etc.

More recently, thin plastic films and sheets, nets or other open weave materials and synthetic particulate materials have been suggested as improved mulches.

However, both the naturally occurring mulches and synthetic particulate materials are susceptible to wind and rain which will readily blow or wash them away.

Further, to control effectively evaporation of moisture from the soil they must be uniformly and thinly spread. This presents several problems. In the first place it is difficult to spread the mulch to a uniform depth and even more difficult to maintain such uniformity during the growing season. Furthermore, these mulches do not provide optimum control of the soil temperature because they are affected to a significant degree by the sun's radiant energy and the adjacent air in the same manner as the soil itself is affected.

The use of nets or other open weave materials effectively prevents seeds from washing away but does not provide optimum control of soil temperature or the necessary reduction in the evaporation loss. Another disadvantage in employing nets and the like is that they are difficult to remove from the soil.

Recently thin plastic films and sheets have come into use as mulches. Polyethylene film, for example, has been used both in its translucent or transparent state, or in its opaque state, i.e., filled with an opaque filler such as carbon black. Polyethylene was originally considered admirably suited to this use because it withstood weathering very well and thus could be reused year after year. In this respect, the polyethylene mulch could be and was picked up off the ground at the end of the growing season and relaid after plowing at the beginning of the next season. By thus reusing the mulch for more than one growing season, it was thought that economic advantage was thus given to the farmer sufficient to induce him to purchase the polyethylene mulch, which probably carries a somewhat higher price than the various natural mulches.

It has been found, however, that at least for certain circumstances and with certain crops, it is not economically desirable to pick up the mulch at the end of the growing season and relay it the next year. Rather, it would be more desirable not to have to pick up the mulch, thus conforming more closely to the practice with natural mulches. These natural mulches are not picked up but rather are turned back into the soil upon plowing at the start of the next growing season.

Further, it has been discovered that certain desirable materials can be incorporated into the polymeric mulch which are then leached out during the growing season at some rate depending upon weather and particularly rainfall conditions. These materials include fertilizers, soil conditioners, and chemical agents as, for example, herbicides, insecticides, etc. It is possible that under certain weather conditions not all of these materials will be leached out of the polymeric mulch during the growing season, and therefore that which remains in the mulch is lost to the soil until the next growing season, when the mulch is relaid. However, some of these materials which remain in the mulch will be lost during the winter storage. Further, if all of these materials are used either in one growing season or over other periods of time, when the mulch is reapplied, these same materials will have to be readded to the soil through a vehicle other than the mulch since reincorporation of them into the mulch would be extremely inconvenient and expensive.

Other thin plastic films and sheets have been developed which decompose when subjected to the elements during a growing season. These films, therefore, do not require retrieval after a growing season but consequently do not provide uniform soil protection throughout an entire season.

The objects, therefore, of the invention are to provide a synthetic agricultural mulch which, when laid on soil surrounding plant sites will prevent soil erosion, prevent or retard weed growth, increase soil water retention and moderate soil temperature throughout a growing season and which is turned back into the soil upon plowing at the start of the next growing season.

These and other objects will become apparent from the more detailed description of the invention given hereinafter.

SUMMARY OF THE INVENTION

In accordance with the present invention, a mixture comprising (1) a fibrous material, (2) water, (3) a wetting agent, (4) a thickening material, (5) an acrylic polymer emulsion, and (6) a polyepoxide is agitated to form a foam. The foam is then applied, e.g., by extrusion onto the surface of the soil where it dries and cures to form an air and water permeable protective coating which retains its structural integrity throughout the growing season and may be broken up and turned into the soil at the beginning of the next growing season.

The essence of the present invention resides in the mixture used to produce the foam. While not wishing to be restricted to any particular theory, it is believed that cross-linking between the polyepoxide and components of the acrylic polymer emulsion results in a foamed material which retains its structural integrity under the impact of rain and after prolonged contact with aqueous solutions.

Other aspects and advantages of the present invention will be apparent from the more detailed description of the invention given hereinafter.

DESCRIPTION OF THE PREFERRED EMBODIMENTS

The nature of the fibrous starting material is not critical. Cellulose fibers are preferred and wood pulp of moderate alpha cellulose content represents a convenient source thereof. While refined wood pulps having high alpha cellulose contents may be used it is sufficient to employ cheap and readily available fiber sources: old newspapers and cotton linters represent good sources. The fiber length is advantageously less than one-half inch, and desirably less than one-quarter inch. Longer fibers are more difficult to disperse but may be present in small amounts (i.e., about 1 to 10 percent) to add strength.

The relative proportions of fibrous material and water should be such as to produce a tractable slurry. Generally this calls for a weight ratio of water to cellulose of at least about 8.5 : 1, generally about 8.5 to 15 : 1 and preferably about 8.5 to 12 : 1.

The amount of fibrous material that should be present in the dried foam product can be varied over a wide range depending upon the properties and uses desired. Generally, the fibrous material should constitute from about 30 to 90 percent, preferably about 50 to 85 percent by weight, based on the weight of the dried foam product.

The nature of the wetting agent is not critical except that it should be compatible with the other ingredients used and one which has the property of forming relatively stable bubbles or foam in their presence. Exemplary of such wetting agents are sodium lauryl sulfate, particularly a grade containing some free lauryl alcohol, the glucoside saponin, salts (particularly sodium salts) of long chain sulfonic acids such as long chain alkylbenzene sulfonic acids, long chain alkanolamides such as lauric mono — or di-ethanolamide, alkylphenol — ethylene oxide condensation products, and long chain quarternary ammonimum compounds, such as hexadecyltrimethyl — ammonimum bromides, and mixtures thereof. The proportion by weight of wetting agent in the mixture is advantageously in the range of about 0.1 to 0.5 percent, generally about 0.1 to 0.4 percent and preferably about 0.1 to 0.3 percent.

Suitable thickening materials for use in this invention include the water soluble salts of carboxymethyl cellulose, i.e., sodium, ammonimum, calcium and potassium carboxymethyl cellulose, sodium alginate and other water soluble alginates, poly (sodium acrylate), poly (ammonimum acrylate) and copolymers containing these acrylic monomers. The thickening material should be present in an amount in the range of from about 0.1 to 2.0 percent, generally about 0.2 to 1.5 percent and preferably about 0.3 to 1.0 percent based on the weight of the mixture.

Polyelectrolytic thickening materials are preferred, however, nonelectrolytic thickening material such as starch can be employed. They are not preferred since they generally require a significantly higher concentration to be as effective as the polyelectrolytic thickeners.

Absent small, almost catalytic amount of thickening material, the emulsion polymers migrate during drying to the bottom by drainage and to the upper surface by "wicking." This migration leaves the interior weak and moisture sensitive.

On the other hand, if too much of the polyelectrolyte thickening material is used, i.e., an amount equal to that of the emulsion polymer, the viscosity of the slurry is relatively high, foaming is difficult, if not impossible, and the movement of the slurry requires excessive pressures.

The acrylic polymer emulsions which are used in the preparation of the foamed material of this invention comprise polymers consisting essentially of alkyl esters of a polymerizable alpha beta unsaturated monocarboxylic acid and a polymerizable alpha beta unsaturated carboxylic acid.

The alkyl esters of a polymerizable alpha beta unsaturated monocarboxylic acid may be represented by the formula:

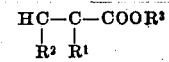

wherein $R^1$ and $R^2$ are hydrogen or an alkyl radical containing one or two carbon atoms, and $R^3$ is an alkyl radical containing from one to 10 carbon atoms. The typical monomers falling within this description include, among others: methyl acrylate ethyl acrylate, propyl acrylate, n-butyl acrylate, isobutyl acrylate, 2-ethylhexyl acrylate, methyl methacrylate, ethyl methacrylate, isobutyl methacrylate, 2-ethylhexyl methacrylate, etc.

The polymerizable alpha beta unsaturated carboxylic acid is an essential portion of the emulsion composition of the present invention. Such acids include monoethylenically unsaturated monocarboxylic acids, such as acrylic acid, methacrylic acid, ethacrylic acid and crotonic acid: monoethylenically unsaturated dicarboxylic acids, such as maleic acid, fumaric acid, itaconic acid, and citraconic acid, and the half esters of these acids, such as methyl hydrogen fumarate, benzyl hydrogen maleate, butyl hydrogen maleate octyl hydrogenitaconate and dodecyl hydrogen citraconate, i.e., half esters wherein the reacted alcohol portion contains one to about 20 carbon atoms; and monoethylenically unsaturated tricarboxylic acids, such as aconitic acid. Such acids include the halogen substituted (i.e., fluoro-, chloro-, and bromo-substituted) derivatives, i.e., alpha chloro-acrylic acid, and the anhydrides of these acids, if available, i.e., maleic anhydride and citraconic anhydride.

The preferred acids, which are an essential portion of the emulsion polymer composition of this invention are polymerizable alpha beta unsaturated carboxylic acids having the formula:

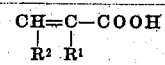

wherein $R^1$ is hydrogen or an alkyl radical containing one or two carbon atoms and $R^2$ is hydrogen, an alkyl radical containing one or two carbon atoms or a carboxy group. Among such acids are acrylic: methacrylic: alpha, beta di-methyl acrylic, ethacrylic, crotonic, isocrotonic, angelic, tiglic and the like.

The acrylic polymer emulsion may be prepared by any of the procedures well known in emulsion art. Such procedures generally involve adding, under rapid stirring, one or more ethylenically unsaturated monomers to water which contains or to which is added, either simultaneously or subsequently surfactants or emulsifying agents, a polymerization catalyst or initiator and, in many cases, a protective coloid-forming substance. This mixture is then heated to polymerization temperature, with continued stirring, and held at that temperature for a period sufficient to substantially complete polymerization of the monomers or monomers and form the polymer emulsion.

Numerous commercial formulations are available. For example, the acrylic polymer emulsion of Example I was prepared by the polymerization of ethyl acrylate and methacrylic acid along with various emulsifier, catalyst and activator solutions. The emulsion polymer comprises 42 percent weight of solids and consists of four parts ethyl acrylate to one part methacrylic acid.

The polymer emulsion should be present in an amount equal to about from 1 to 20 percent, generally about from 2 to 10 percent, and preferably about 3 to 7 percent based on the weight of the mixture.

The polyepoxides to be used in the present invention comprise the organic materials having at least two epoxy groups, i.e.,

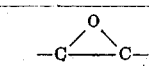

groups, per molecule. The polyepoxides may be saturated or unsaturated, aliphatic, cycloaliphatic, aromatic or heterocyclic and may be substituted if desired with other substituents, such as hydroxyl groups, halogen atoms, ether radicals, and the like. They may also be monomeric or polymeric.

Examples of the polyepoxides include, among others, epoxidized diglycerides, epoxidized triglycerides, the epoxy polyethers of polyhydric phenols and the glycidyl ethers of novolac resins, which resins are obtained by condensing an aldehyde with a polyhydric phenol.

Examples of the polymeric type polyepoxides include the polyepoxypolyhydroxy polyethers obtained by reacting, preferably in an alkaline medium, a polyhydric alcohol or polyhydric phenol with epichlorhydrin or such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bis-phenol and epichlorhydrin, the reaction product of resorcinol and bis(2,3-epoxypropyl)ether, and the reaction product of catechol and bis(2,3-epoxypropyl)ether.

Other polyepoxide compounds include the polymers and copolymers of the epoxy-containing monomers possessing at least one polymerizable ethylenic linkage.

Another group of polyepoxides include the epoxy esters of polybasic acids, such as diglycidyl phthalate and diglycidyl adipate, diglycidyl tetrahydrophthalate, diglycidyl maleate, and the like.

Water-dispersible polyepoxides are the preferred polyepoxides for use in this invention. Examples of such water-dispersible polyepoxides include the triglycidyl ethers of trimethylol ethane, trimethylol propane and glycerol and the diglycidyl ethers of propylene glycol, ethylene glycol, polyethylene glycol and resorcinol. The triglycidyl ether of trimethylol ethane is available commercially under the trade name EPIREZ 5042 (Celanese) while the triglycidyl ether of glycerol is available under the trade name EPONITE 100 (Shell).

The wet mixture of this invention should have the polyepoxide present in an amount of about 0.1 to 5 percent, generally about 0.2 to 2 percent, and preferably about 0.3 to 0.7 percent by weight.

In operation the hardenable cellulose foam is suitably produced in a transportable apparatus which may be mounted for example, on a vehicle. The fibrous cellulose solution, including the emulsion polymer, may be situated in one container and the polyepoxide component in a second container. The fibrous cellulose solution and the polyepoxide are combined in a mixing chamber and foamed therein. The foaming may be affected by vigorous mechanical movement by which air is sucked into the mixing chamber.

The foam formed in the mixing chamber may then be applied with the aid of conventional nozzles, especially nozzles that have a wide slot, to the surface of ths soil where it hardens. As nozzles use may be made of all those which are customary for other purposes, for example, in the usual foam fire extinguishing apparatus.

In many cases it is sufficient to cover the space between the rows of plants or seeds with the cellulose foam in the forms of strips, but obviously the entire surface of the soil may be covered. The thickness of the layer of foamed resin may be varied within wide limits. The layer of foam applied in general has a thickness of about one-eighth to 1½ inches, preferably about one-fourth to three-fourths inches. It takes approximately 3 days at ambient temperature for the foam to harden, but such time can vary within wide limits, because of atmospheric conditions, i.e., temperature, humidity, wind, rain, etc.

Amine curing agents may also be incorporated to accelerate hardening of the foam.

Since the proposed soil covering, depending on the amount of foam applied, can be made more or less porous, it permits the passage of air and at the same time prevents the destruction of the soil surface by pelting rain but nevertheless permits the penetration of the rain water into the soil. At the same time the evaporation of water is controlled and the soil protected against erosion. Further considerable advantage of the proposed process consists of the fact that an innumerable variety of additional material such as plant foods, fertilizers, insect repellent, bactericides, insecticides, fungicides, animal repellants, soil conditioners and the like in a wide range of concentractions may be incorporated into the cellulose foam to perform desired functions. These materials are leached out of the foam during the growing season at a rate dependent upon weather conditions particularly rainfall. Any of these materials not completely leached out of the foam will be turned into the soil upon plowing at the beginning of the next season.

The addition of dark dyestuffs or pigments is recommended if it is desired that the cellulose foam impart a heat absorbing action. All such pigments may be used, for example, carbon black or dark modification of iron oxides.

The total amount of additives present in the dry foam should be less than about 35 percent, preferably less than about 30 percent, based on the weight of dried foam.

It is understood that the foregoing detailed description is given merely by way of illustration and that many variations may be made therein without departing from the spirit of the invention.

The following examples are illustrative of the invention and are not intended to limit the scope thereof.

EXAMPLE I

In order to illustrate the use of the cellulose foams of the instant invention, the following ingredients are added to a mixing tank: 220 parts by weight of wood pulp (commercially available Celanese Acetate Grade wood pulp) 1,900 parts by weight of water, 10 parts by weight of a sodium carboxymethyl cellulose thickening agent (commercially available under the name Hercules 7MS), one part by weight of lauric diethanolamide wetting agent (General Aniline LD176), and two parts by weight of sodium dodecylbenzenesulfonate (Atlantic Ultrawet K Soft), 100 parts by weight of an emulsion polymer comprising 42 percent by weight of solids and consisting of four parts of ethyl acrylate to one part of methacrylic acid and 10 parts by weight of Celanese Epirez 5042 (a water-dispersible polyepoxide).

The mixture is agitated for sufficient time and intensity in order to thoroughly mix the ingredients and eventually form a foam having a volume about 2.5 times the original volume of the ingredients.

The resulting foam is spread over soil employing slightly modified standard spreading equipment and it is allowed to cure at ambient temperature, i.e., about 22°C. for a period of about 3 days. The depth of the spread foam is about three-eighths of an inch.

The resulting dry foam remains intact under the impact of heavy rainfall and is stable to moist frost and other detrimental weathering.

EXAMPLE II

In a manner similar to Example I, the following ingredients are added to a mixing tank: 220 parts by weight of wood pulp (commercially available Celanese Acetate Grade wood pulp) 1,900 parts by weight of water, 10 parts by weight of a sodium carboxymethyl cellulose thickening agent (commercially available under the name of Hercules 7MS), one part by weight of lauric diethanolamide wetting agent (General Aniline LD 176), and two parts by weight of sodium dodecylbenzenesulfonate (Atlantic Ultrawet K Soft), 100 parts by weight of an emulsion polymer comprising 42 percent by weight of solids and consisting of four parts of ethyl acrylate to one part of methacrylic acid and 10 parts by weight of Shell Eponite 100 (a water-dispersible polyepoxide).

The mixture is agitated for sufficient time and intensity in order to thoroughly mix the ingredients and eventually form a foam having a volume about two and one-half times the original volume of the ingredients.

The resulting foam is spread over soil employing slightly modified standard spreading equipment and it is allowed to cure at ambient temperature, i.e., about 22°C. for a period of about 3 days. The depth of the spread foam is about three-eighths of an inch.

As with the product of Example I, the resulting dry foam remains intact under the impact of heavy rainfall and is stable to moist frost and other detrimental weathering.

EXAMPLE III

This example serves to illustrate the use of the cellulose foams of the instant invention but without the use of epoxy ingredient.

Accordingly, the following ingredients are added to a mixing tank: 220 parts by weight of wood pulp (commercially available Celanese Acetate Grade wood pulp) 1,900 parts by weight of water, 10 parts by weight of a sodium carboxymethyl cellulose thickening agent (commercially available under the name Hercules 7MS), one part by weight of lauric diethanolamide wetting agent (General Aniline LD176), and two parts by weight of sodium dodecylbenzenesulfonate (Atlantic Ultrawet K Soft) and 100 parts by weight of an emulsion polymer comprising 42 percent by weight of solids and consisting of four parts of ethyl acrylate to one part of methacrylic acid.

The mixture is agitated for sufficient time and intensity in order to mix the ingredients thoroughly and eventually form a foam having a volume about two and one-half times the original volume of the ingredients.

As in the preceeding examples, the resulting foam is also spread over soil employing slightly modified standard spreading equipment and it is allowed to cure at ambient temperature, i.e., about 22°C. for a period of about 3 days. The depth of the spread foam is about three-eighths of an inch.

The resulting dry foam, however, does not remain intact under the impact of heavy rainfall nor is it stable to moist frost and other detrimental weathering as the foams of the instant invention is.

EXAMPLE IV

In order to illustrate the use of the cellulose foams of the instant invention, the following ingredients are added to a mixing tank: 220 parts by weight of wood pulp (commercially available Celanese Acetate Grade wood pulp) 1,900 parts by weight of water, 10 parts by weight of a sodium carboxymethyl cellulose thickening agent (commercially available under the name Hercules 7MS), one part by weight of lauric diethanolamide wetting agent (General Aniline LD176), and two parts by weight of sodium dodecylbenzenesulfonate (Atlantic Ultrawet K Soft), 100 parts by weight of an emulsion polymer consisting of four parts of vinyl acetate to one part of maleic anhydride and 10 parts by weight of Celanese Epirez 5042 (a water-dispersible polyepoxide).

The mixture is agitated for sufficient time and intensity in order to thoroughly mix the ingredients and eventually form a foam having a volume about two and one-half times the original volume of the ingredients.

The resulting foam is spread over soil employing slightly modified standard spreading equipment and it is allowed to cure at ambient temperature, i.e., about 22°C. for a period of about 3 days. The depth of the spread foam is about three-eighths of an inch.

The resulting dry foam remains intact under the impact of heavy rainfall and is stable to moist frost and other detrimental weathering.

EXAMPLE V

The recipe of Example 1 is followed except that 5 parts by weight of an amine curing agent, tris(dimethylaminomethyl) phenol is incorporated into the ingredients prior to foaming. In this instance the curing is accelerated thus allowing the applied foam to cure at temperatures substantially lower than ambient temperatures.

EXAMPLE VI

In this Example the recipe of Example I is duplicated except that two parts by weight of carbon black are added in order to darken the foam.

What is claimed is:

1. A method for coating a soil with an agricultural mulch comprising:
   A. agitating a mixture containing cellulose fibrous material, water, a wetting agent, a thickening material, an acrylic polymer emulsion comprising a copolymer of alkyl esters of polymerizable alpha beta unsaturated monocarboxylic acids and a polymerizable alpha beta unsaturated carboxylic acid, and a polyepoxide comprising an organic material having at least two epoxy groups per molecule to produce a foam,
   B. extruding said foam onto the surface of the soil and
   C. allowing said foam to dry and cure.
2. The method according to claim 1 wherein the wetting agent is a salt of a long chain sulfonic acid.
3. The method according to claim 1 wherein the wetting agent is a mixture of lauric diethanolamide and sodium dodecylbenzenesulfonate.
4. The method according to claim 1 wherein the thickening material is a polyelectrolyte.
5. The method according to claim 4 wherein the polyelectrolyte thickening material is sodium carboxymethyl cellulose.
6. The method according to claim 1 wherein the acrylic polymer emulsion comprises polymers consisting of ethyl acrylate and methacrylic acid.
7. The method according to claim 1 wherein the acrylic polymer emulsion comprises polymers consisting of vinyl acetate and maleic anhydride.
8. A method according to claim 1 wherein the polyepoxide is the triglycidyl ether of trimethylol ethane.
9. The method according to claim 1 wherein an amine curing agent is added to the mixture to accelerate curing of the foam.
10. The method of claim 1 wherein the foam is applied to the surface of the soil to a thickness of about one-fourth to three-fourths inches.

* * * * *